(No Model.) 6 Sheets—Sheet 4.

J. B. E. ROUSSEAU & J. BOUTET.
LEATHER MEASURING MACHINE.

No. 591,883. Patented Oct. 19, 1897.

Witnesses
J. Ruel.
A. Page.

Jean Baptiste Edmond Rousseau,
and Joseph Boutet, Inventors

By Attorney J. A. Marion (No Model.) 6 Sheets—Sheet 5.
J. B. E. ROUSSEAU & J. BOUTET.
LEATHER MEASURING MACHINE.
No. 591,883. Patented Oct. 19, 1897.
FIG. 5.
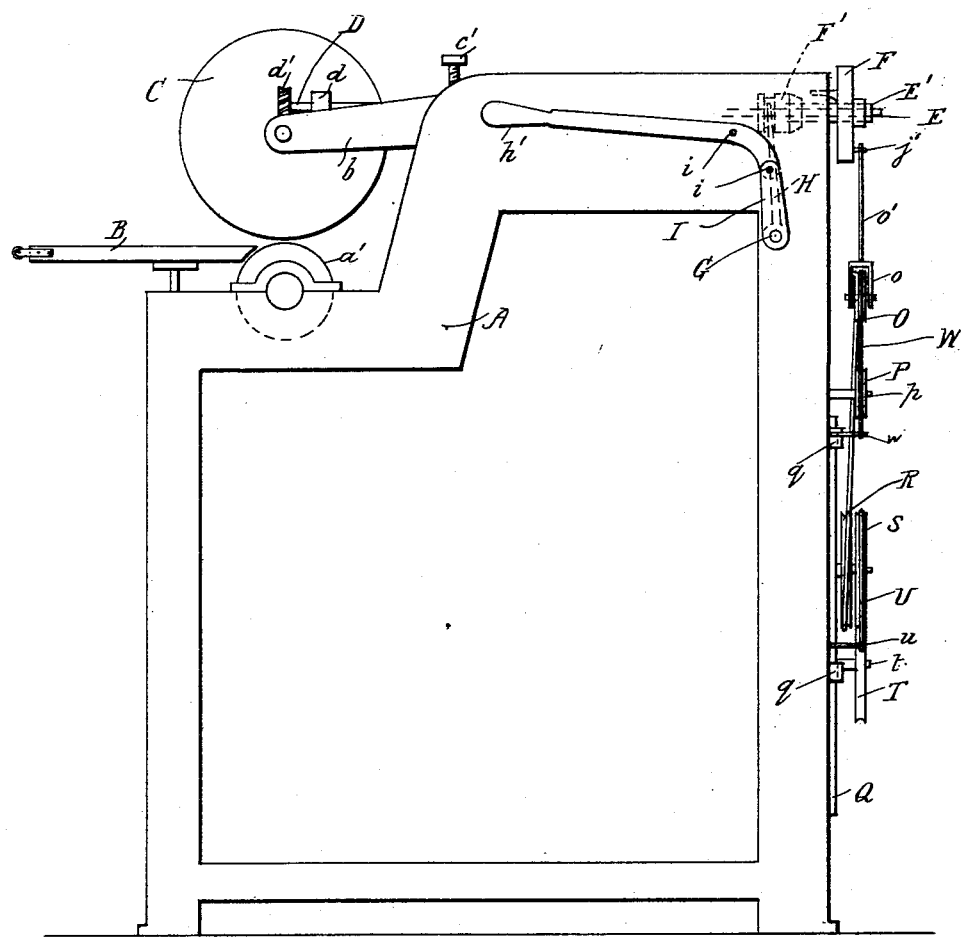
Witnesses
J. Ruel.
A. Pagé.
Jean Baptiste Edmond Rousseau,
and Joseph Boutet, Inventors
By Attorney 

(No Model.) 6 Sheets—Sheet 6.

J. B. E. ROUSSEAU & J. BOUTET.
LEATHER MEASURING MACHINE.

No. 591,883. Patented Oct. 19, 1897.

Witnesses
J. Ruel.
A. Page.

Jean Baptiste Edmond ROUSSEAU
and Joseph BOUTET, Inventors

By Attorney J. A. Marion

THE NORRIS PETERS CO., PHOTO-LITHO., WASHINGTON, D. C.

UNITED STATES PATENT OFFICE.

JEAN BAPTISTE EDMOND ROUSSEAU AND JOSEPH BOUTET, OF QUEBEC, CANADA.

LEATHER-MEASURING MACHINE.

SPECIFICATION forming part of Letters Patent No. 591,883, dated October 19, 1897.

Application filed October 31, 1896. Serial No. 610,671. (No model.)

*To all whom it may concern:*

Be it known that we, JEAN BAPTISTE EDMOND ROUSSEAU and JOSEPH BOUTET, citizens of the Dominion of Canada, residing at Quebec, in the county of Quebec and Province of Quebec, Canada, have invented certain new and useful Improvements in Leather-Measuring Machines; and we do hereby declare the following to be a full, clear, and exact description of the invention, such as will enable others skilled in the art to which it appertains to make and use the same.

This invention relates to machines for measuring leather; and it consists in the novel construction and combination of the parts hereinafter fully described and claimed.

Figure 1:
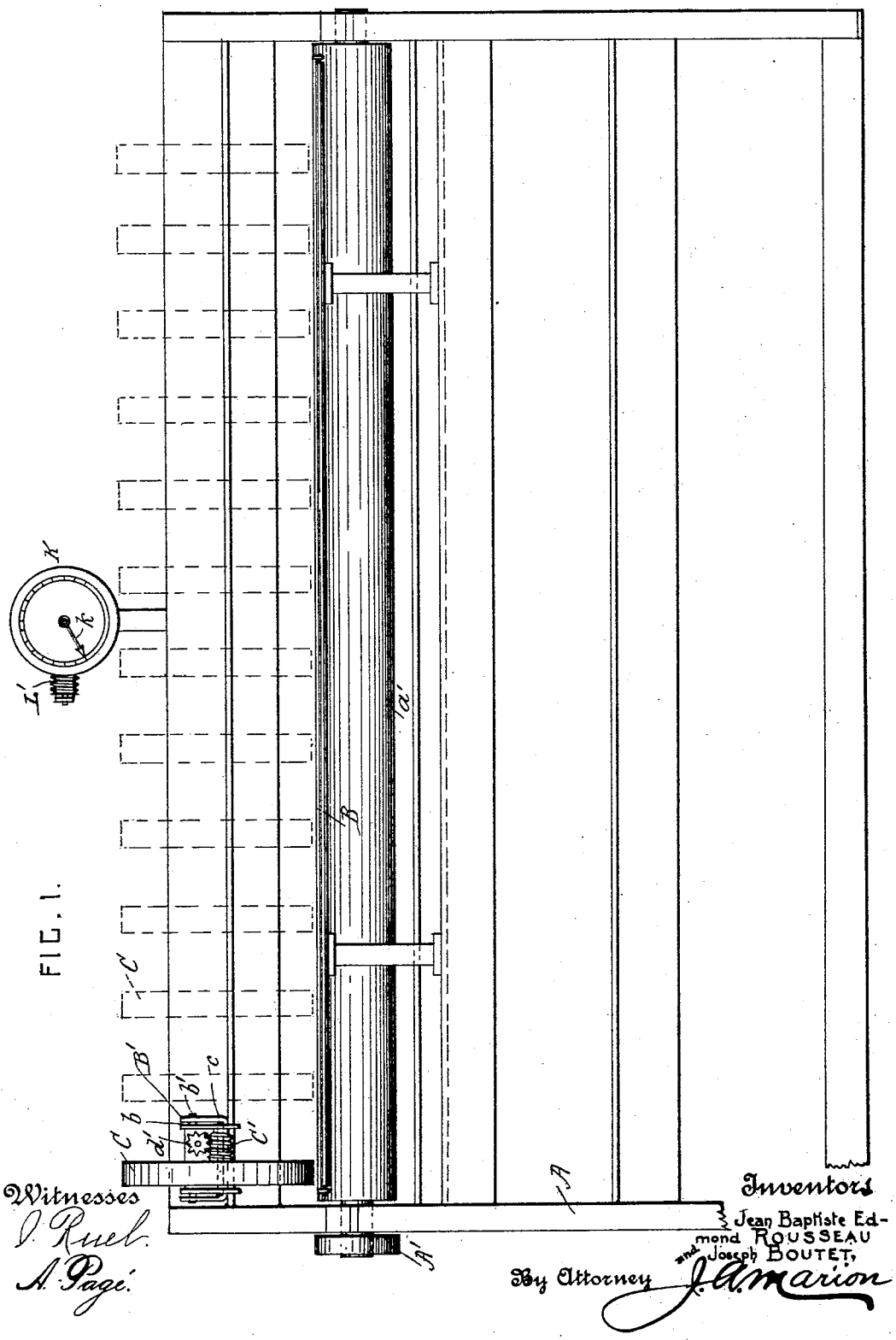
Figure 2:
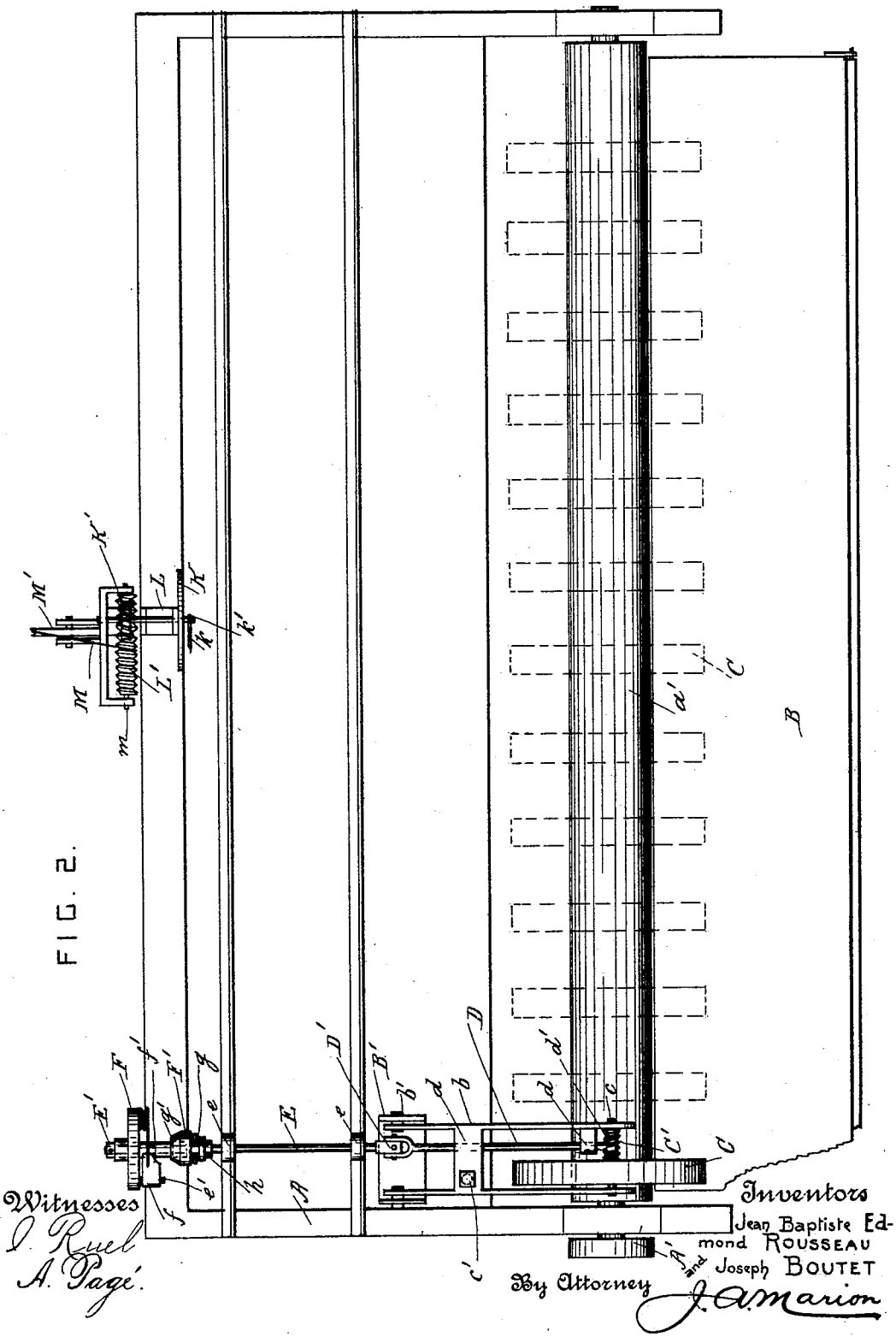
Figure 3:
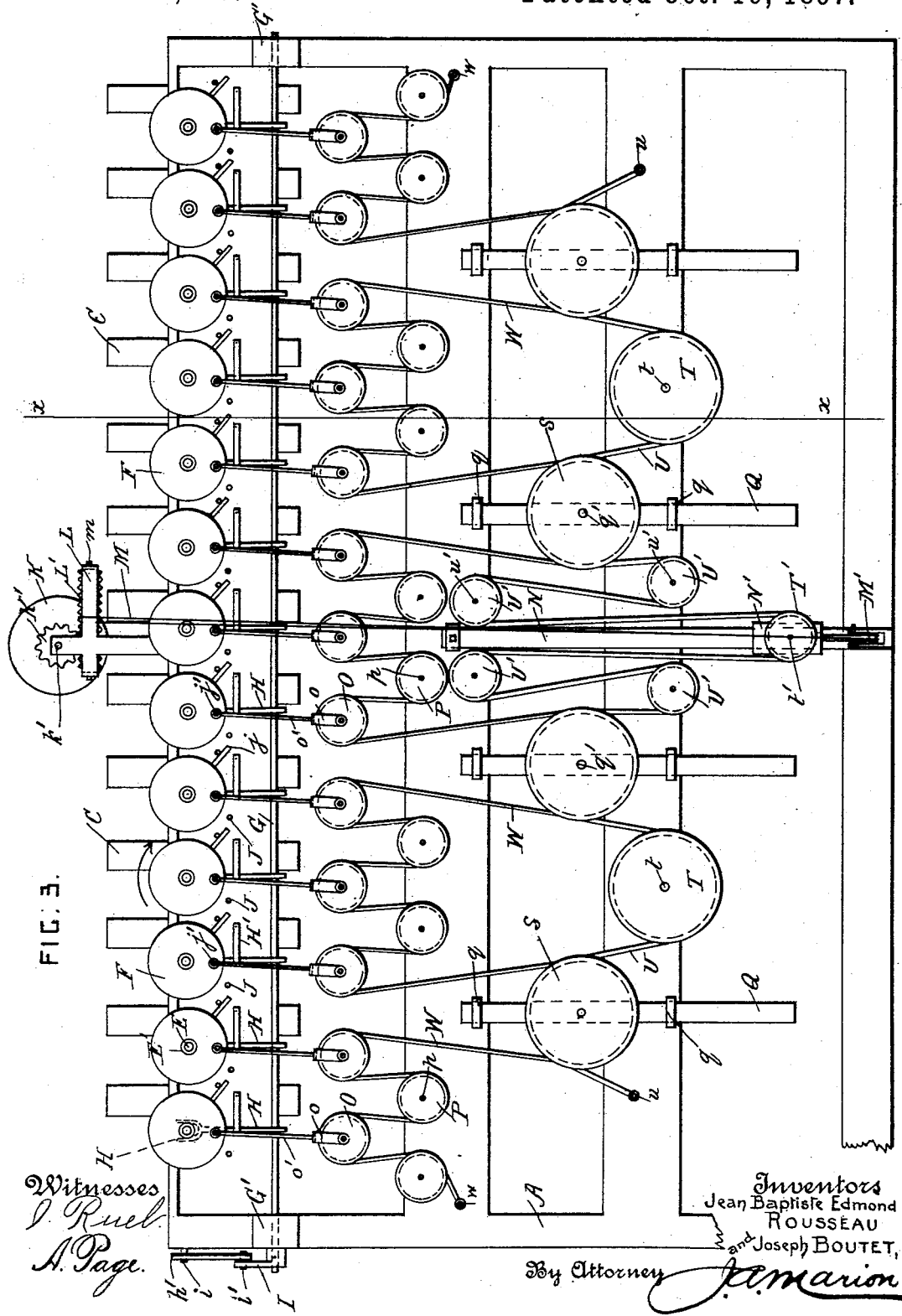
Figure 4:
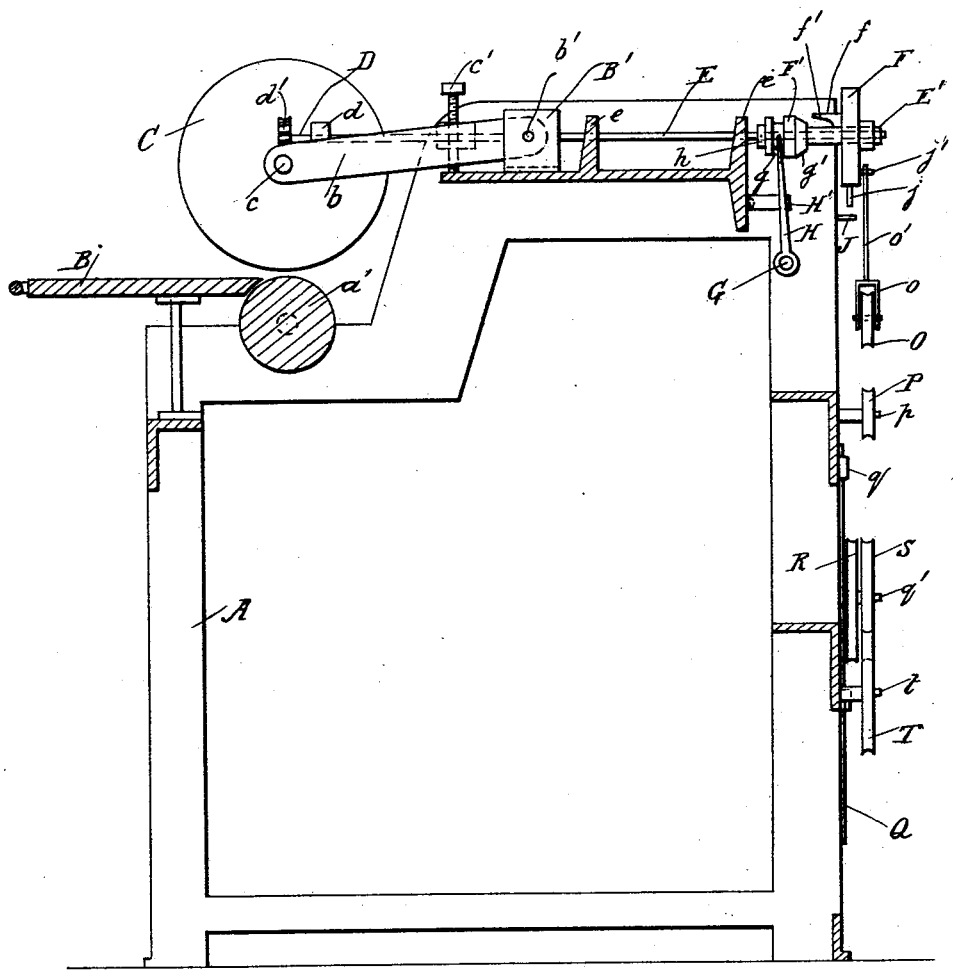
Figure 6:
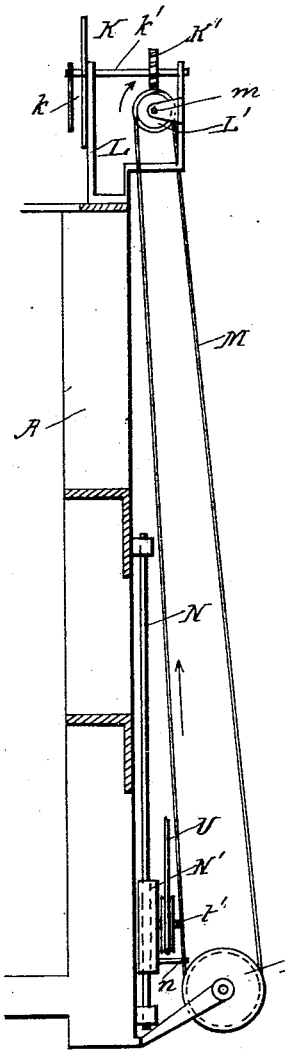
Figure 7:
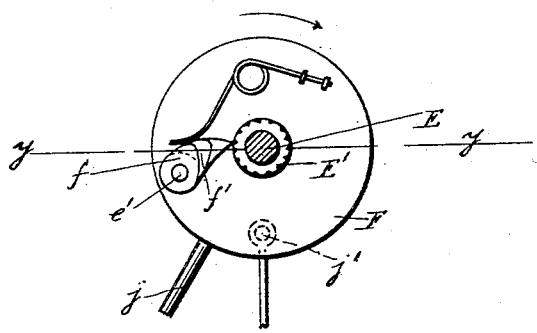
Figure 8:
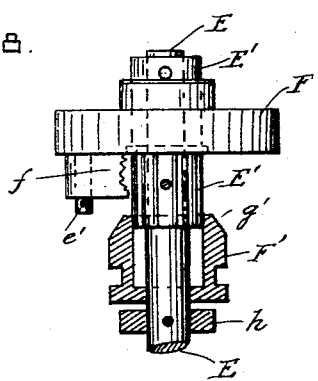

In the drawings, Figure 1 is a front view of the machine, with some parts omitted. Fig. 2 is a plan view of the same. Fig. 3 is a rear view of the machine. Fig. 4 is a cross-section taken on the line $x$ $x$ in Fig. 3. Fig. 5 is an end view of the machine. Fig. 6 is a detail side view of the mechanism for operating the indicator. Fig. 7 is a detail front view of a pawl for driving a crank-plate. Fig. 8 is a plan view, partly in longitudinal section, taken on the line $y$ $y$ in Fig. 7.

A is the frame of the machine, and $a'$ is a feed-roller journaled at the front part of the frame and provided with a belt-pulley A' for revolving it continuously.

B is a table supported in front of the feed-roller for receiving the side of leather before it enters the machine.

C are rollers arranged in a series over the feed-roller $a'$. This series of rollers is indicated by dotted lines in Figs. 1 and 2, one roller only and the parts connected to it being fully described and illustrated, as the other rollers and parts are the same as those shown.

B' is a bracket secured to the top of the frame A, and $b$ is a frame pivoted to the bracket B' by pins $b'$. The roller C is secured on a shaft $c$, which is journaled in the front end of the frame $b$. A worm C' is secured on the shaft $c$, and $c'$ is a set-screw engaging with a lug on the bracket B' and bearing on the top of the frame, whereby the roller C is prevented from bearing on the feed-roller $a'$.

D is a shaft journaled in bearings $d$ on the frame $b$, and $d'$ is a worm-wheel secured on the front end of the shaft D and gearing into the worm C'.

E is a shaft journaled in bearings $e$ on the frame A, substantially in line with the shaft D, and D' is a universal coupling of any approved construction connecting the adjacent ends of the shafts D and E.

E' is a sleeve secured on the rear end of the shaft E, and F is a crank-plate journaled on the sleeve E'. A spring-pressed pawl $f$ is pivoted on the pin $e'$, projecting from the back of the crank-plate F and bears against the periphery of the sleeve E', so that the crank-plate is turned when the shaft E is moved in the direction of the arrow in Fig. 7, but remains stationary when the said shaft is moved in the reverse direction. The pawl $f$ is provided with an inclined shoulder $f'$, and F' is a sleeve which is journaled on the shaft E and the rear end of the sleeve E'. The sleeve F' is provided with a circumferential groove $g$ and a beveled shoulder $g'$ for engaging with the inclined shoulder $f'$.

G is a rock-shaft journaled in bearings G' and extending across the rear of the machine. A forked lever H is secured on the rock-shaft G under each shaft E, and its forked end engages with the groove $g$ and affords a means for sliding the shoulder $g'$ into engagement with the shoulder $f'$ and thereby throwing the pawl out of engagement with the sleeve E'. The sleeve E' may be serrated or toothed, if desired, to prevent the pawl from slipping.

H' is a spring which normally holds the sleeve F' against the collar $h$ on the shaft E. A handle $h'$ is operatively connected with the rock-shaft G at one end of the machine, so that all the sleeves F' may be operated simultaneously. The handle $h'$ is pivoted on the pin $i$ and engages with the pin $i'$, projecting from the end of the lever I, which is secured on the end of the shaft G. The crank-plate F is provided with a pin $j$, which strikes against a stop J, projecting from the frame A, when the crank-plate has been turned one-quarter of a revolution in the direction of the arrow in Fig. 3. Each crank-plate F is provided with a crank-pin $j'$.

K is the indicator, comprising a dial-plate having a pointer $k$ on a shaft $k'$, journaled at its center, and K' is a worm-wheel secured on the shaft k'.

L is a bracket which supports the shaft k', and L' is a worm which gears into the worm-wheel K'. The worm L' is secured on a shaft m.

M is an endless flexible driving device, such as a cord or chain, which is looped over the worm L' and passes over a pulley M', supported at the lower part of the frame A.

N is a vertical guide secured to the frame A, and N' is a weight which slides on the guide N and is provided with a pin n, which connects it to the cord M, so that the indicator is operated by raising the weight N'. The weight N' is raised through intermediate connections by means of the crank-plates F.

O are sheaves journaled in blocks o, which are connected to the crank-pins j' by means of cords or chains o'.

P are sheaves journaled on pins p, projecting from the frame A between and below the sheaves O.

Q are four bars sliding vertically in guides q on the frame A. Sheaves R are journaled on pins q', projecting from the bars Q, and S are similar sheaves journaled on the pins q' alongside the sheaves R, but independent of them.

T are sheaves journaled on pins t, projecting from the frame A between and below the end pairs of sheaves S, and T' is a sheave journaled on a pin t', projecting from the weight N'.

U is a flexible connection, such as a chain or cord, having its ends secured to pins u, projecting from the frame A. The cord U is passed over the sheaves S and under the sheaves T and T'.

U' are guide-sheaves for the cord U, pivoted on pins u', projecting from the frame A. These sheaves are interposed between the sheave T' and the adjacent sheaves T, as shown in Fig. 3, so that the weight may be raised higher than it could be raised if the cord U passed direct from the sheave T' to the adjacent sheaves T.

W is a flexible connection, such as a chain or cord, which has its ends secured to the pins w, projecting from the frame A. The cord W passes over all the sheaves O and under all the sheaves P and R. Any approved tightening device may be used for regulating the lengths of the cords U and W.

The operation of the machine is as follows: When the side of leather is slid onto the revolving feed-roller, it raises all the rollers C which touch it and revolves them. As the leather is of irregular shape and sometimes has open spaces in it, some of the rollers C will remain stationary. The rollers C, which revolve, turn the shafts D and E by means of the worms and worm-wheels, and the shafts E partially revolve the crank-plates F and raise the sheaves O. The sheaves O raise the sheaves R and S and the bars Q by means of the cord W. The sheaves S raise the weight N' by means of the cord U, and the weight N' operates the cord which drives the indicator. The indicator is moved in proportion to the sum of the movements of the rollers C, which is governed by the area of the side of leather which is put through the machine, and the area may be read off from the indicator-dial plate. When a side of leather has been put through the machine, the handle h' is moved to throw all the driving-pawls out of gear. This permits all the vertically-slidable parts to descend by gravity, and automatically restores the pointer of the indicator to zero.

What we claim is—

1. In a measuring-machine, the combination, with a main frame, and a shaft E journaled therein; of a crank-plate journaled on the shaft E, a connection—such as a pawl—between the said shaft and crank-plate whereby the crank-plate is revolved by the shaft in one direction only, a frame b pivoted to the main frame, a roller journaled in the free end of the frame b, a shaft D journaled in the frame b, a universal joint coupling the shafts D and E, and toothed driving-wheels coupling the said roller with the shaft D, substantially as set forth.

2. In a measuring-machine, the combination, with a series of vertically-movable rollers for bearing on the leather, of a series of crank-plates each operatively connected with one of the said rollers, an indicator, a series of sheaves O each suspended from one of the said crank-plates, a series of stationary sheaves P, stationary sheaves T, vertically-slidable sheaves R and S journaled concentric with each other in pairs, a flexible connection W passing over the sheaves O and under the sheaves P and R, and a flexible connection U passing over the sheaves S and under the sheaves T and operatively connected with the said indicator, substantially as set forth.

3. In a measuring-machine, the combination, with a series of revoluble crank-plates, of a series of sheaves O each suspended from one of the said crank-plates, an indicator, a series of stationary sheaves P, stationary sheaves T, vertically-slidable bars, guides for the said bars, sheaves R and S journaled in pairs on pins projecting from the said bars, a flexible connection W passing over the sheaves O and under the sheaves P and R, and a flexible connection U passing over the sheaves S and under the sheaves T and operatively connected with the said indicator, substantially as set forth.

In testimony whereof we affix our signatures in presence of two witnesses.

JEAN BAPTISTE EDMOND ROUSSEAU.
JOSEPH BOUTET.

Witnesses:
N. C. LELIÉNI,
A. BINET.